Oct. 18, 1932.   A. H. AVERY   1,882,729
TOOL FOR LAYING SHOE FILLER
Filed March 4, 1931   2 Sheets-Sheet 1
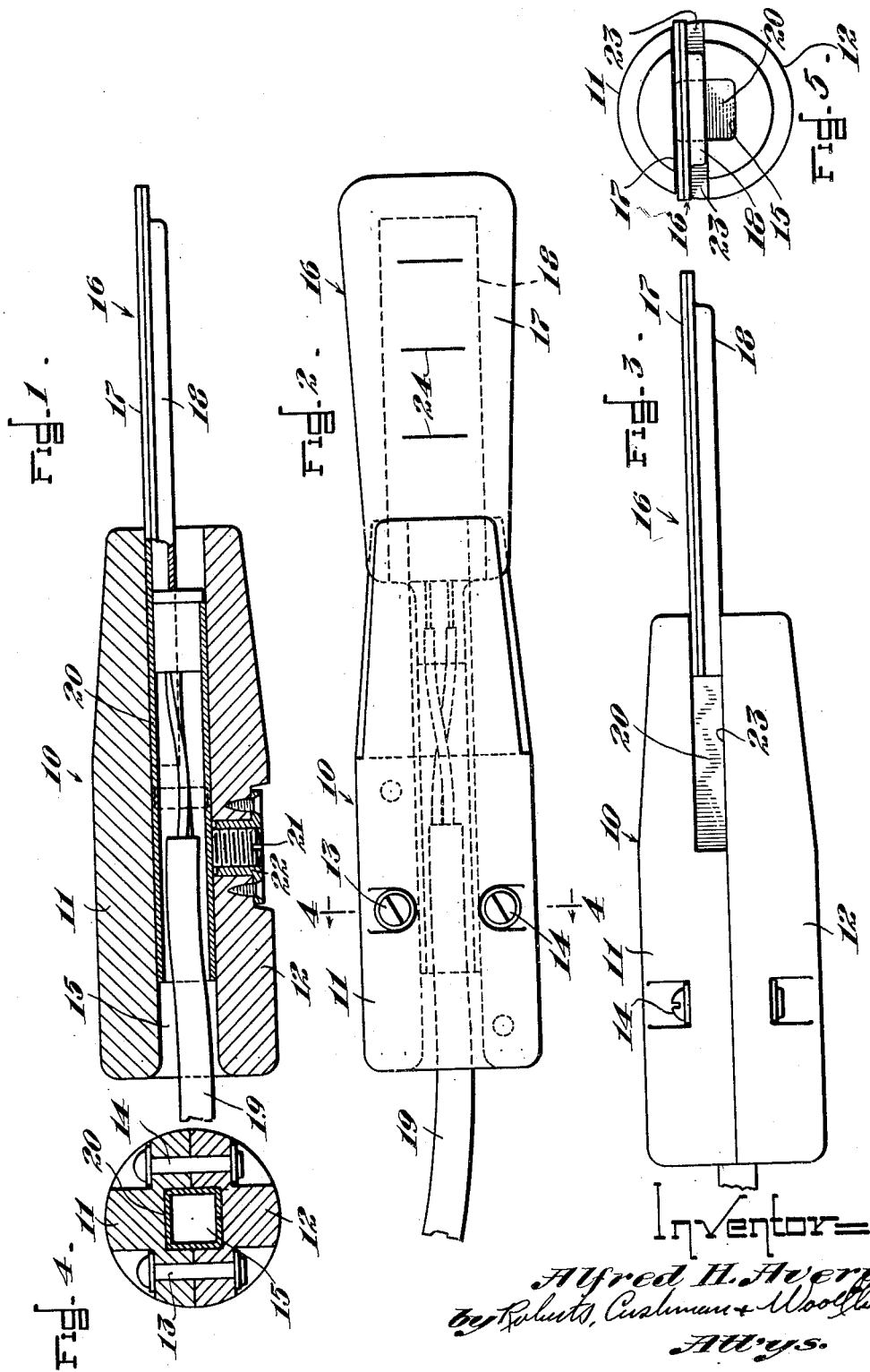

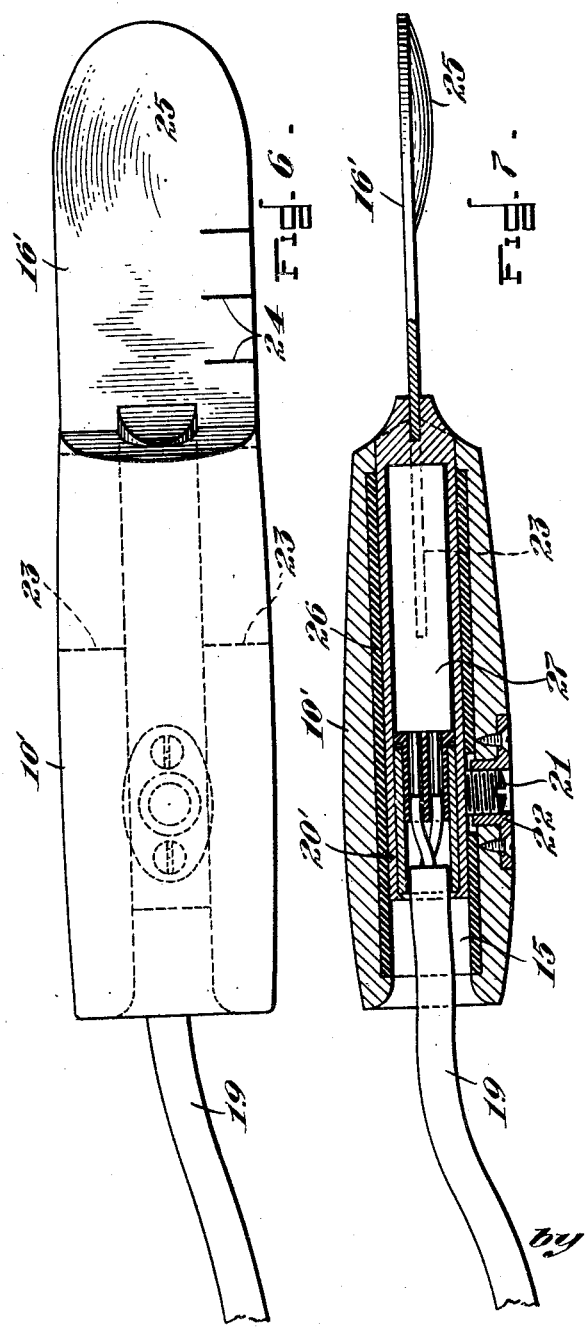

Patented Oct. 18, 1932

1,882,729

UNITED STATES PATENT OFFICE

ALFRED H. AVERY, OF MALDEN, MASSACHUSETTS, ASSIGNOR TO NORTH AMERICAN CHEMICAL COMPANY, OF CAMBRIDGE, MASSACHUSETTS, A CORPORATION OF MASSACHUSETTS

TOOL FOR LAYING SHOE FILLER

Application filed March 4, 1931. Serial No. 520,007.

This invention relates to a tool for filling the bottom cavities of shoes with plastic shoe filler of the character described in a series of patents granted to Andrew Thoma, consisting largely of a comminuted body material, such as ground cork, and a sticky binder, such as wax tailings. Such shoe filler when furnished to the shoe manufacturer in bulk form, is usually preconditioned for use by heat and moisture in a suitable machine furnished for that purpose, and the operator then dips or scoops up from the mass by means of a tool or spatula somewhat resembling a putty knife, a quantity of the filler suitable for filling a single shoe bottom cavity, then deposits it in the cavity and then spreads it throughout the cavity and smooths it off, in much the same manner as a mason lays mortar with a trowel. The blade of the tool is usually heated, both to render the plastic filler more fluid or more easily spreadable and to prevent the filler from sticking to the tool. Examples of tools for performing this work are described in the Thoma Patent No. 878,688, dated February 11, 1908 and in the Thoma Patent No. 808,227, dated December 26, 1905.

The quantity of filler dipped up by such tools was largely dependent on the skill, judgment, and experience of the operator. The size and capacity of bottom cavities differ substantially in shoes of different sizes and different styles and having no guide other than his own judgment as to the quantity of filler that should be dipped up on the tool for the work in hand, the operator was likely to dip up too large or too small a quantity, with the result that he would either have to scrape off and dispose of excess filler, or go back to the supply for more filler to make up a deficiency As the requirements of shoe making become more exacting it is desirable to furnish the operator with a shoe filling tool which will itself determine, at least approximately, the measured quantity of filler to be scooped up at each operation, and which may be adjusted to vary the measured quantity scooped up in accordance with the requirements of different runs or lots of shoes. To this end I have devised a tool for laying shoe filler having a blade mounted for adjustment lengthwise in the handle so as to vary the area of that part of the blade which projects beyond the end of the handle and which is exposed and available to receive and hold the filler.

In the accompanying drawings which illustrate certain embodiments of the invention:

Fig 1 is a vertical longitudinal section of one form of the tool;

Fig. 2 is a top plan view; and Fig. 3 is a side elevation of the tool shown in Fig. 1;

Fig. 4 is a cross section on line 4—4 of Fig. 2;

Fig. 5 is an end view of said tool looking toward the blade end;

Fig. 6 is a top plan view of a modified form of tool; and

Fig. 7 is a vertical longitudinal section of the tool shown in Fig. 6.

Referring first to the form of tool shown in Figs. 1 to 5, the handle 10 of the tool, made of non-heat-conductive material, is preferably formed in two sections 11 and 12 divided longitudinally and held together by screws 13 and 14. A hollow 15 extends longitudinally through the handle and is open at both ends. The blade 16 is made up of a substantially flat top 17 used for lifting or dipping up the measured quantity of filler from the mass and a hollow bottom 18 having rounded corners and used for spreading or molding and smoothing the filler layer during the spreading operation in the shoe bottom cavity. The bottom 18 forms with the top 17 a hollow chamber in which is contained an electrical heating unit of usual type supplied with current from conductors 19. The blade 16 is carried on the forward end of a blade carrier 20 which is mounted in the hollow 15 to slide lengthwise of the handle. The blade carrier is in the form of a hollow box-like housing open at the rear end so that the terminals of the conductors 19 which enter the handle at the rear end are housed within the hollow blade carrier 20. A set screw 21 threaded into a bushing 22 extending through one side of the handle holds the blade carrier 20 in an adjusted position lengthwise of the handle.

It will be observed that the blade 16 is materially wider than the hollow 15 of the handle; indeed it may be wider than the outside diameter of the handle itself. In order to permit the blade to be shortened or retracted into the handle, the handle is provided with a slot 23 at each side opening through the end of the handle toward the blade. These slots receive the two side margins of the blade 16 when the latter is moved inwardly with relation to the handle.

With the construction described it will be seen that by loosening the set screw 21 the blade 16 and blade carrier 20 may be moved lengthwise of the handle to expose a greater or less area of the blade projecting beyond the end of the handle as may be desired. To assist in setting the blade at the desired adjustment graduations or markings 24 may be provided on the blade to indicate the proper area of the blade to be exposed when the tool is used for different classes of work. By shortening or lengthening the exposed area of the blade it may be so adjusted as to pick up with substantial accuracy the measured quantity of filler suitable for the work in hand without depending solely on the judgment of the operator.

Referring now to the form of tool shown in Figs. 6 and 7, in its main features the tool is substantially similar to that shown in the other figures. The handle 10' is made with a hollow 15 extending lengthwise through the handle and open at both ends. The hollow 15 is encased by a bushing 26 in which is mounted the blade carrier 20' for sliding movement endwise of the handle. A set screw 21 in a threaded bushing 22 holds the blade carrier 20' in adjusted position. The blade 16' is carried by the forward end of the blade carrier but instead of being made hollow as in the other form of tool it is solid and is given a slightly dished or spoon-like form at its end, as shown at 25. The electrical heating unit instead of being housed within the blade itself is housed at 27 within the blade carrier and is fed by conductors 19 entering the hollow handle through the rear end, as before, and having their terminals housed within the blade carrier 20'. Thus the blade instead of being heated directly by the heating unit is heated by conduction from the blade carrier. The handle is slotted at each side as shown at 23 to receive the side margins of the blade when the blade is retracted into the handle.

I claim:

1. A tool for laying shoe filler in shoe bottom cavities, comprising a hollow handle, a blade carrier movable lengthwise within the hollow handle and a blade of greater width than the hollow of the handle, secured to the blade carrier and projecting beyond the end of the handle, the handle having slots in its end to receive the blade when the blade is retracted into the handle.

2. A tool for laying shoe filler in shoe bottom cavities, comprising a hollow handle, a blade carrier in the form of a hollow housing movable lengthwise within the hollow handle, a blade secured to the blade carrier and projecting beyond one end of the handle, an electrical heater for heating the blade, and electrical conductors for the heater entering the blade carrier at the other end and having their terminals housed therein.

3. A tool for laying shoe filler in shoe bottom cavities, comprising a hollow handle, a blade carrier in the form of a hollow housing movable lengthwise within the hollow handle, a blade secured to the blade carrier and projecting beyond one end of the handle, an electrical heater for heating the blade housed within the blade carrier, and electrical conductors for the heater entering the blade carrier at the other end and having their terminals housed therein.

Signed by me at Boston, Massachusetts this 2nd day of March, 1931.

ALFRED H. AVERY